(12) United States Patent
Yuasa

(10) Patent No.: US 12,372,354 B2
(45) Date of Patent: *Jul. 29, 2025

(54) SURVEYING INSTRUMENT

(71) Applicant: TOPCON Corporation, Tokyo-to (JP)

(72) Inventor: Taichi Yuasa, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 1041 days.

This patent is subject to a terminal disclaimer.

(21) Appl. No.: 17/383,574

(22) Filed: Jul. 23, 2021

(65) Prior Publication Data

US 2022/0026207 A1     Jan. 27, 2022

(30) Foreign Application Priority Data

Jul. 27, 2020   (JP) ................................ 2020-126660

(51) Int. Cl.
*G01C 15/00*   (2006.01)
*G01S 7/481*   (2006.01)
(Continued)

(52) U.S. Cl.
CPC .......... *G01C 15/002* (2013.01); *G01S 7/4811* (2013.01); *G01S 7/4812* (2013.01);
(Continued)

(58) Field of Classification Search
CPC ....... G01C 15/002; G01C 3/02; G01S 7/4811; G01S 17/10; G01S 17/66; G01S 7/4817; G01S 7/4812; G01S 7/4815; G01S 17/42

See application file for complete search history.

(56) References Cited

U.S. PATENT DOCUMENTS

2003/0107721 A1*   6/2003   Shirai ................. G01S 7/4812
                                                                        356/4.01
2009/0016678 A1*   1/2009   Kawamura .......... G02B 6/4214
                                                                        385/33
(Continued)

FOREIGN PATENT DOCUMENTS

JP            2018-179588 A        11/2018

OTHER PUBLICATIONS

European communication dated Jan. 5, 2022 in corresponding European patent application No. 21187612.3 (Europe).

*Primary Examiner* — Yuqing Xiao
*Assistant Examiner* — Rachel Nguyen
(74) *Attorney, Agent, or Firm* — Nields, Lemack & Frame, LLC

(57) ABSTRACT

Provided is a surveying instrument including a distance measuring light projector configured to project a distance measuring light to an object, a distance measuring light receiver having a photodetector configured to receive a reflected distance measuring light from the object, a tracking light projector configured to project a tracking light to the object, a tracking light receiver having a tracking photodetector configured to receive a reflected tracking light from the object, and an image pickup module configured to receive a background light, in which the distance measuring light projector and the tracking light projector include a first deflecting optical member, and the distance measuring light projector, the tracking light projector, and the image pickup module include a second deflecting optical member.

13 Claims, 5 Drawing Sheets

(51) Int. Cl.
*G01S 17/10* (2020.01)
*G01S 17/66* (2006.01)

(52) U.S. Cl.
CPC .............. *G01S 17/10* (2013.01); *G01S 17/66* (2013.01); *G01S 7/4817* (2013.01)

(56) References Cited

U.S. PATENT DOCUMENTS

| | | |
|---|---|---|
| 2017/0123052 A1 | 5/2017 | Hinderling |
| 2017/0168141 A1* | 6/2017 | Yuasa ..................... G01S 17/42 |
| 2018/0292514 A1 | 10/2018 | Yoshino |
| 2019/0078883 A1* | 3/2019 | Yuasa ................ G02B 27/1006 |
| 2019/0154805 A1* | 5/2019 | Ohtomo ............... G01C 15/002 |
| 2020/0124417 A1* | 4/2020 | Vogel ..................... G01S 17/08 |

* cited by examiner

SURVEYING INSTRUMENT

BACKGROUND OF THE INVENTION

The present invention relates to a surveying instrument which can acquire three-dimensional coordinates of an object.

A surveying instrument such as a laser scanner or a total station has an electronic distance measurement device which detects a distance to an object which is to be measured by the prism distance measurement using a reflecting prism as the object or the non-prism distance measurement using no reflecting prism.

As one of conventional surveying instruments, there is one having a distance measuring unit configured to measure a distance to an object, a tracking module configured to tracking the object, and an image pickup module configured to image pickup the object. However, in the conventional surveying instruments, the distance measuring unit, the tracking module, and the image pickup module are often provided on different axes for keeping an optical system compact.

Further, even if the tracking module and the image pickup module are coaxially provided, the tracking module and the image pickup module share a light receiver for keeping the optical system compact. Therefore, a light receiving amount available for the tracking and the imaging is limited, highly accurately performing the tracking or the imaging at a long distance is difficult.

SUMMARY OF INVENTION

It is an object of the present invention to provide a surveying instrument which can highly accurately perform the tracking and the imagine even at a long distance.

To attain the object as described, a surveying instrument according to the present invention includes a distance measuring light projector configured to project a distance measuring light to an object, a distance measuring light receiver having a photodetector configured to receive a reflected distance measuring light from the object, a tracking light projector configured to project a tracking light to the object, a tracking light receiver having a tracking photodetector configured to receive a reflected tracking light from the object, and an image pickup module configured to receive a background light, wherein the distance measuring light projector and the tracking light projector include a first deflecting optical member is configured to deflect any one of the distance measuring light and the tracking light in such a manner that the distance measuring light and the tracking light become coaxial with each other, and the distance measuring light projector, the tracking light projector, and the image pickup module include a second deflecting optical member is configured to coaxially reflect the distance measuring light, the tracking light, and the background light respectively and transmit through the reflected distance measuring light and the reflected tracking light.

Further, in the surveying instrument according to a preferred embodiment, the second deflecting optical member is a multilayer optical element having a predetermined plate thickness, the multilayer film optical element has a first incidence surface present at a position close from the distance measuring light projector and a second incidence surface present at a position away from the distance measuring projector, the first incidence surface is configured to transmit through the distance measuring light and the tracking light and reflect the background light, the second incidence surface has a beam splitter film with a predetermined reflectance formed on an incidence portion for the distance measuring light and the tracking light, an antireflective film is formed on portions other than the beam splitter film, wherein the distance measuring light and the tracking light are reflected coaxially with the background light by the beam splitter film, and the reflected distance measuring light and the reflected tracking light are transmitted through the beam splitter film and the antireflective film.

Further, in the surveying instrument according to a preferred embodiment, a laser pointer light projector configured to irradiate the object with a laser pointer light, wherein the image pickup module is configured to receive a reflected laser pointer light reflected by the object together the background light, the laser pointer light projector and the image pickup module include a third deflecting optical member configured to deflect any one of the laser pointer light and the background light in such a manner that the laser pointer light and the background light become coaxial with each other, and the laser pointer light and the reflected laser pointer light are configured to be reflected on the first incidence surface.

Further, in the surveying instrument according to a preferred embodiment, each of the distance measuring light and the tracking light is an invisible light, the laser pointer light is a visible light, and a long-pass filter configured to reflect the visible light and transmit through the invisible light is provided on the first incidence surface.

Further, in the surveying instrument according to a preferred embodiment, the multilayer film optical element has a plate thickness and a tilt angle which are enable assuring a predetermined inter-optical-axis distance between optical axes of the distance measuring light and the tracking light and an optical axis of the background light.

Further, in the surveying instrument according to a preferred embodiment, the distance measuring light receiver and the tracking light receiver include a receiving prism provided on a common optical path of the reflected distance measuring light and the reflected tracking light which have been transmitted through the second deflecting optical member, and the receiving prism is configured to internally reflect the reflected distance measuring light and the reflected tracking light more than once, then separate the reflected distance measuring light from the reflected tracking light, cause the reflected distance measuring light to be received by the photodetector, and cause the reflected tracking light to be received by the tracking photodetector.

Further, in the surveying instrument according to a preferred embodiment, the receiving prism includes a first prism configured to internally reflect the reflected distance measuring light and the reflected tracking light and a second prism configured to internally reflect the reflected tracking light, a boundary surface between the first prism and the second prism is a surface facing a surface of the first prism from which the reflected distance measuring light is projected, and the boundary surface is a separating surface for the reflected distance measuring light and the reflected tracking light.

Further, in the surveying instrument according to a preferred embodiment, a dichroic filter film is provided on the separating surface, and is configured to reflect the reflected distance measuring light and transmit through the reflected tracking light.

Further, in the surveying instrument according to a preferred embodiment, the distance measuring light projector includes a light emitter configured to change an emission repetition frequency of the distance measuring light and a peak power of pulses to at least two emission repetition frequencies and the peak power of pulses, the distance measuring light receiver includes a light amount adjusting member insertable into and removable from an optical axis of the reflected distance measuring light, and the light amount adjusting member is configured to adjust a light receiving amount of the reflected distance measuring light in correspondence with the emission repetition frequency and the peak power of pulses.

Further, in the surveying instrument according to a preferred embodiment, the light amount adjusting member is configured in such a manner that a light amount adjusting surface having a film with a predetermined transmittance is formed at a central portion, and a full-transmission surface having an antireflective film is formed at other portions than the light amount adjusting surface.

Furthermore, in the surveying instrument according to a preferred embodiment, further includes a frame unit configured to horizontally rotate around a horizontal rotation shaft by a horizontal rotation motor, a scanning mirror configured to vertically rotate around a vertical rotation shaft by a vertical rotation motor provided in the frame unit, to irradiate the object with the distance measuring light and the tracking light, and to receive the reflected distance measuring light and the reflected tracking light from the object, and an arithmetic control module configured to control driving of the horizontal rotation motor, the vertical rotation motor, the distance measuring light projector, and the tracking light projector, wherein the arithmetic control module is configured to control the horizontal rotation motor and the vertical rotation motor based on a light receiving position of the reflected tracking light with respect to the tracking photodetector in such a manner that the object is tracked.

According to the present invention, there is provided a surveying instrument including a distance measuring light projector configured to project a distance measuring light to an object, a distance measuring light receiver having a photodetector configured to receive a reflected distance measuring light from the object, a tracking light projector configured to project a tracking light to the object, a tracking light receiver having a tracking photodetector configured to receive a reflected tracking light from the object, and an image pickup module configured to receive a background light, wherein the distance measuring light projector and the tracking light projector include a first deflecting optical member is configured to deflect any one of the distance measuring light and the tracking light in such a manner that the distance measuring light and the tracking light become coaxial with each other, and the distance measuring light projector, the tracking light projector, and the image pickup module include a second deflecting optical member is configured to coaxially reflect the distance measuring light, the tracking light, and the background light respectively and transmit through the reflected distance measuring light and the reflected tracking light. As a result, a reach enabling the tracking and the imaging can be increased, and the tracking and the imaging can be highly accurately performed even at a long distance.

DETAILED DESCRIPTION OF THE PREFERRED EMBODIMENT

Figure 1:
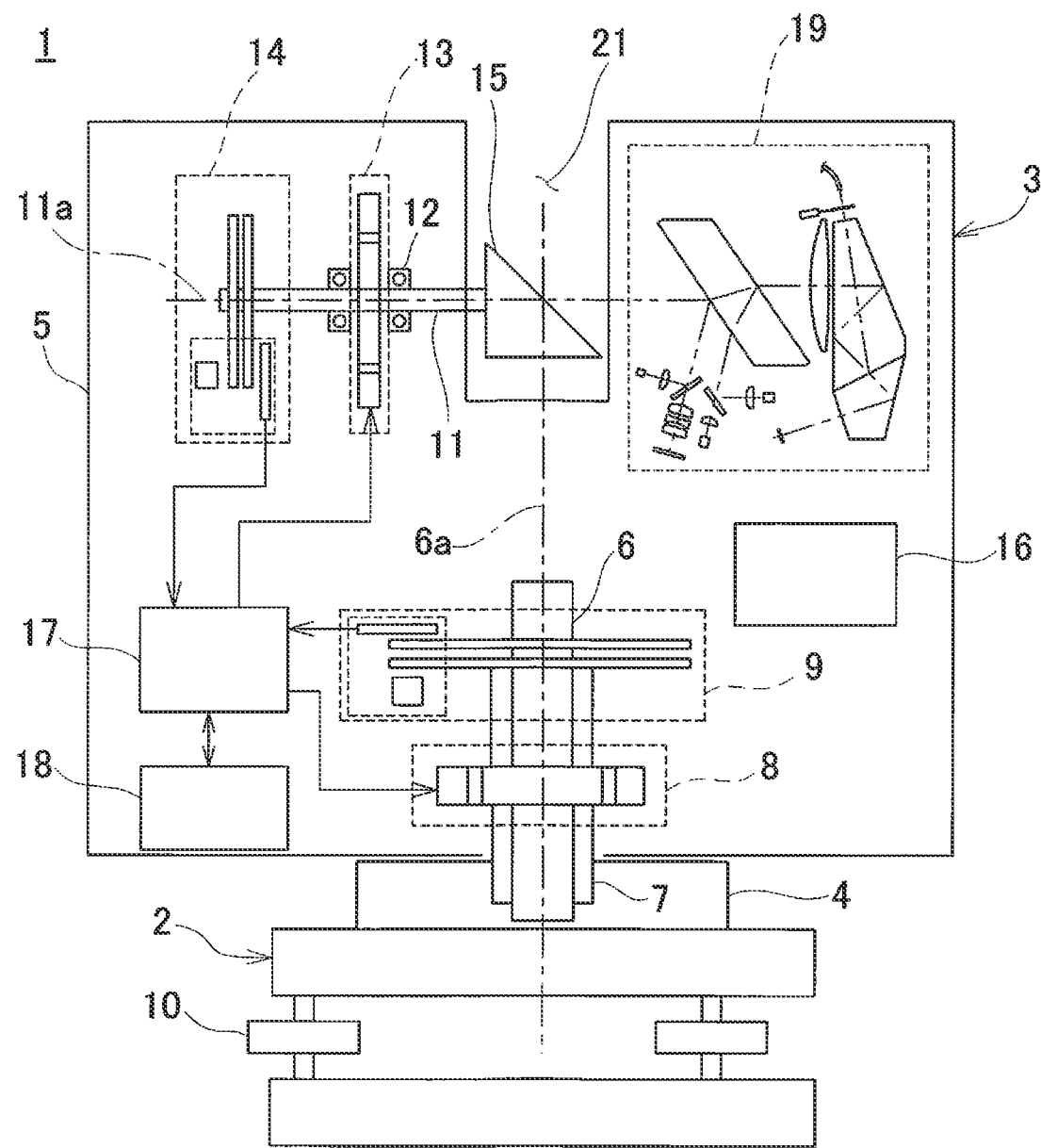
FIG. 1 is a front sectional drawing to show a surveying instrument according to an embodiment of the present invention.

A description will be given on an embodiment of the present invention by referring to the attached drawings.

A surveying instrument 1 is, for instance, a laser scanner, and constituted of a leveling module 2 mounted on a tripod (not shown) and a surveying instrument main body 3 mounted on the leveling module 2. It is to be noted that the surveying instrument 1 can perform both the prism measurement and the non-prism measurement.

The leveling module 2 has leveling screws 10, and the surveying instrument main body 3 is leveled up by the leveling screws 10.

The surveying instrument main body 3 includes a fixing unit 4, a frame unit 5, a horizontal rotation shaft 6, a horizontal rotation bearing 7, a horizontal rotation motor 8 as a horizontal rotation driving module, a horizontal angle encoder 9 as a horizontal angle detector, a vertical rotation shaft 11, a vertical rotation bearing 12, a vertical rotation motor 13 as a vertical rotation driving module, a vertical angle encoder 14 as a vertical angle detector, a scanning mirror 15 which is a vertical rotation module, an operation panel 16 which serves as both an operation module and a display module, an arithmetic control module 17, a storage module 18, a distance measuring unit 19 and others. It is to be noted that, as the arithmetic control module 17, a CPU specialized for this instrument or a general-purpose CPU is used.

The horizontal rotation bearing 7 is fixed to the fixing unit 4. The horizontal rotation shaft 6 has a vertical axis 6a and the horizontal rotation shaft 6 is rotatably supported by the horizontal rotation bearing 7. Further, the frame unit 5 is supported by the horizontal rotation shaft 6 and the frame unit 5 integrally rotates with the horizontal rotation shaft 6 in the horizontal direction.

The horizontal rotation motor 8 is provided between the horizontal rotation bearing 7 and the frame unit 5, and the horizontal rotation motor 8 is controlled by the arithmetic control module 17. The arithmetic control module 17 rotates the frame unit 5 around the axis 6a by the horizontal rotation motor 8.

A relative rotation angle of the frame unit 5 with respect to the fixing unit 4 is detected by the horizontal angle encoder 9. A detection signal from the horizontal angle encoder 9 is input to the arithmetic control module 17, and the horizontal angle data is calculated by the arithmetic control module 17. The arithmetic control module 17 performs the feedback control of the horizontal rotation motor 8 based on the horizontal angle data.

Further, in the frantic unit 5, the vertical rotation shaft 11 having a horizontal axis 11a is provided. The vertical rotation shaft 11 can rotate via the vertical rotation bearing 12. It is to be noted that an intersection of the axis 6a and the axis 11a is a projecting position for a distance measuring light, and the inter section is an origin of a coordinate system of the surveying instrument main body 3.

A recess portion 21 is formed in the frame unit 5. One end portion of the vertical rotation shaft 11 extends to the inside of the recess portion 21. Further, the scanning mirror 15 is fixed to the one end portion, and the scanning mirror 15 is accommodated in the recess portion 21.

Further, the vertical angle encoder 14 is provided at the other end portion of the vertical rotation shaft 11. The vertical rotation motor 13 is provided on the vertical rotation shaft 11, and the vertical rotation motor 13 is controlled by the arithmetic control module 17. The arithmetic control module 17 rotates the vertical rotation shaft 11 by the vertical rotation motor 13. Further, the scanning mirror 15 is rotated around the axis 11a.

A rotation angle of the scanning mirror 15 is detected by the vertical angle encoder 14, and a detection signal is input to the arithmetic control module 17. The arithmetic control module 17 calculates the vertical angle data of the scanning mirror 15 based on the detection signal, and performs the feedback control of the vertical rotation motor 13 based on the vertical angle data.

Further, the horizontal angle data and the vertical angle data calculated by the arithmetic control module 17, and measurement results, measuring point intervals (to be described later), and measuring angle intervals (to be described later) are stored in the storage module 18. As the storage module 18, various types of storage devices are used. These storage devices include: an HDD as a magnetic storage device, a CD or a DVD as an optical storage device, a RAM, a ROM, a DRAM, a memory card, a USB memory as a semiconductor storage device and other storage devices. The storage module 18 may be attachable and detachable the frame unit 5. Alternatively, the storage module 18 may enable transmitting the data to an external storage device or an external data processing device via a non-illustrated communicating means.

In the storage module 18, various types of programs are stored. These programs include: a sequence program for controlling the distance measuring operation, a calculation program for calculating a distance by the distance measuring operation, a calculation program for calculating an angle based on the horizontal angle data and the vertical angle data, a calculation program for calculating three-dimensional coordinates of a desired measuring point based on a distance and an angle, a tracking program for tracking an object, a setting program for setting an interval of measuring points or an interval of measuring angles, a control program for controlling the driving of a light amount adjusting member (to be described later) and other programs. Further, when the various types of programs stored in the storage module 18 are executed by the arithmetic control module 17, various types of processing are performed.

The operation panel 16 is, for instance, a touch panel, and the operation panel 16 serves as both an operation module which performs changing the distance measurement instructions or the measurement conditions such as a measuring point interval or a measuring angle interval and a display module which displays a distance measurement result and the like.

Figure 2:
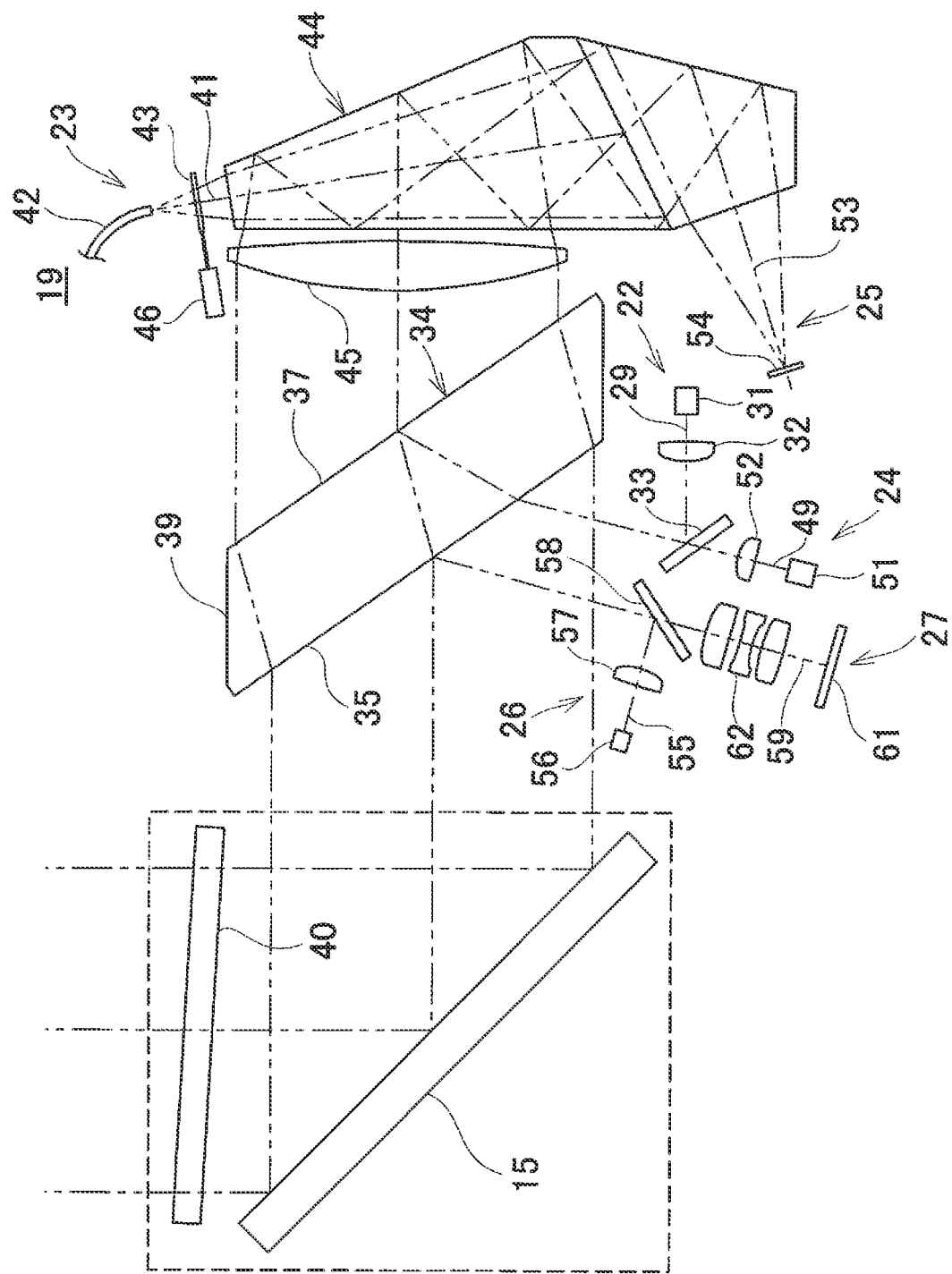
FIG. 2 is a block diagram to show a distance measuring unit according to an embodiment of the present invention.

Next, a description will be given on the distance measuring unit 19 by referring to FIG. 2.

The distance measuring unit 19 mainly has a distance measuring light projector 22, a distance measuring light receiver 23, a tracking light projector 24, a tracking light receiver 25, a laser pointer light projector 26, and an image pickup module 27. It is to be noted that the distance measuring light projector 22 and the distance measuring light receiver 23 constitute a distance measuring module. Further, the tracking light projector 24 and the tracking light receiver 25 constitute a tracking module.

The distance measuring light projector 22 has a projecting optical axis 29. Further, distance measuring light projector 22 has a light emitter 31 provided on the projecting optical axis 29, for instance, a laser diode (LD), a light projecting lens 32, and a beam combiner 33 which is a first deflecting optical member. Further, the distance measuring light projector 22 has a multilayer film optical element 34 as a second deflecting optical member provided on a reflected optical axis of the projecting optical axis 29 reflected by the beam combiner 33. Further, the scanning mirror 15 is provided on a reflected optical axis of the projecting optical axis reflected by the multilayer film optical element 34.

It is to be noted that the light projecting lens 32, the beam combiner 33 and the multilayer film optical element 34 constitute a distance measuring light projecting optical system. Further, in the present embodiment, the projecting optical axis 29, the reflected optical axis of the projecting optical axis 29 reflected by the beam combiner 33, and the reflected optical axis of the projecting optical axis 29 reflected by the multilayer film optical element 34 are generically referred to as the projecting optical axis 29.

The light emitter 31 pulse-emits a laser beam (an invisible light) having an infrared or near-infrared wavelength as a distance measuring light. Alternatively, the light emitter 31 burst-emits the above laser beam as a distance measuring light.

The beam combiner 33 has optical characteristics to transmit through a light having a specific wavelength (a transmitted light) and to coaxially reflect a light having a different specific wavelength with the transmitted light. The beam combiner 33 transmits through a tracking light (to be described later) and reflects the distance measuring light emitted from the light emitter 31 coaxially with the tracking light. That is, the beam combiner 33 is placed on a common optical path of the distance measuring light and the tracking light. It is to be noted that the beam combiner 33 may be configured to reflect the tracking light and transmit through the distance measuring light.

The multilayer film optical element 34 is, for instance, the tabular glass having a predetermined plate thickness, and the multilayer film optical element 34 tilts in the range of, for instance, 60°~120° with respect to the projecting optical axis 29. The thickness of the multilayer film optical element 34 is approximately 15 mm at the time of, for instance, 40ϕ. Further, one surface (a first incidence surface) of the multilayer film optical element 34 which is provided at a position close to the light emitter 31 is a long-pass filter surface 35 having a long-pass filter film vapor-deposited thereon, the long-pass filter surface 35 transmits through an infrared or near-infrared light and reflects a visible light.

Figure 3:
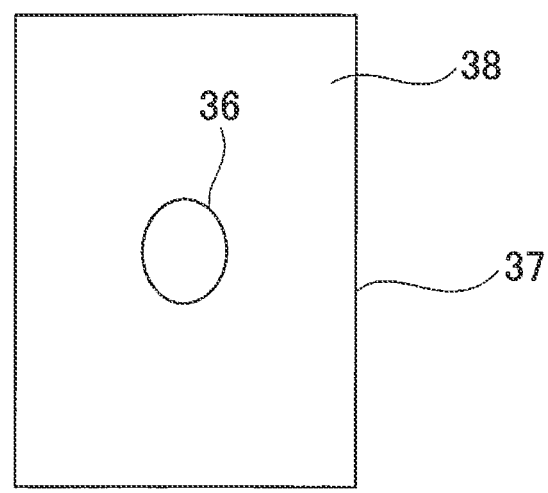
FIG. 3 is a side elevation view to show a beam splitter surface of a multilayer film optical element.

The other surface (a second incidence surface) of the multilayer film optical element 34 which is provided at a position away from the light emitter 31 is a beam splitter surface 37 having a beam splitter film 36 vapor-deposited thereon. As shown in FIG. 3, the beam splitter film 36 is formed only at a portion of the beam splitter surface 37 where the distance measuring light and the tracking light enter. That is, the beam splitter film 36 having an elliptic shape which is substantially the same as a luminous flux diameter of each of the distance measuring light and of the tracking light is formed on the beam splitter surface 37, and an antireflective film 38 is vapor-deposited on a portion excluding the beam splitter film 36. The beam splitter film 36 has optical characteristics to reflect approximately 80% and to transmit approximately 20% of the distance measuring light and the reflected distance measuring light (to be described later), and to reflect approximately 50% to 80% and transmit approximately 50% to 20% of the tracking light and the reflected tracking light (to be described later). Further, on the multilayer film optical element 34, chamfered portions 39 provided by chamfering corner portions are formed.

It is to be noted that the plate thickness and the tilt angle of the multilayer optical element 34 are a plate thickness and a tilt angle with which the distance measuring light projector 22 (the tracking light projector 24) is separated from the laser pointer light projector 26 (the image pickup module 27), and which a predetermined inter-optical-axis distance can be assured between the projecting optical axis 29 (a tracking optical axis 49 (to be described later)) and a laser pointer optical axis 55 (to be described later) (an image pickup optical axis 59 (to be described later)). The multilayer film optical element 34 also functions as an optical axis separating optical member configured to separate the projecting optical axis 29 tracking optical axis 49) from the laser pointer optical axis 55 (the image pickup optical axis 59).

The distance measuring light receiver 23 has a light receiving optical axis 41. Further, the distance measuring light receiver 23 has a light receiver 42, for instance, an optical fiber, a light amount adjusting member 43, and a receiving prism 44 which are provided on the light receiving optical axis 41. Further, the distance measuring light receiver 23 has a focusing lens 45 and the multilayer film optical element 34 provided on a reflected optical axis of the light receiving optical axis 41 reflected by the receiving prism 44. It is to be noted that the light amount adjusting member 43, the receiving prism 44, the focusing lens 45, and the multilayer film optical element 34 constitute a distance measuring light receiving optical system. Further, in the present embodiment, the light receiving optical axis 41 and the reflected optical axis of the light receiving optical axis 41 reflected by the receiving prism 44 are generically referred to the light receiving optical axis 41.

The light receiver 42 is, for instance, a light receiving end face of the optical fiber, and receives the distance measuring light reflected by an object as the reflected distance measuring light. Further, the optical fiber leads the reflected distance measuring light to a photodetector provided at a predetermined position so that the reflected distance measuring light is received by the photodetector. It is to be noted that the photodetector may be provided at a light receiving position of the light receiver 42. Hereinafter the light receiver 42 will be referred to as a photodetector 42.

The light amount adjusting member 43 is, for instance, a glass plane-parallel plate having a known plate thickness, and arranged in such a manner that the light amount adjusting member 43 becomes orthogonal to the light receiving optical axis 41. Further, the light amount adjusting member 43 can be inserted into or removed from the light receiving optical axis 41 by a driving mechanism 46 such as a solenoid. Further, a diameter of the light amount adjusting member 43 is, for instance, approximately 6 mm, and the diameter of the light amount adjusting member 43 is larger than a luminous flux diameter of the reflected distance measuring light (to be described later) at a position where the light amount adjusting member 43 has been inserted.

Figure 4:
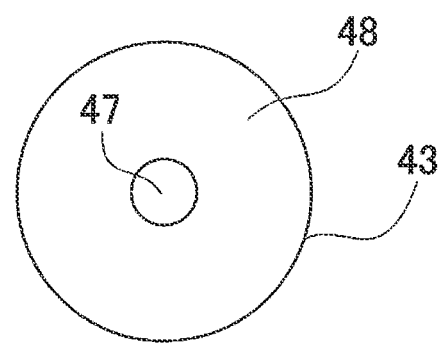
FIG. 4 is a plan view to show a light amount adjusting member.

As shown in FIG. 4, in an incidence surface with respect to the light amount adjusting member 43 of the reflected distance measuring light, a light amount adjusting surface 47 having, for instance, a reflective film vapor-deposited thereon is formed at a central portion of the incident surface, and a full-transmission surface 48 having an antireflective film vapor-deposited thereon is formed at other portions than the light amount adjusting surface 47. The light amount adjusting surface 47 has, for instance, a circular shape having a diameter of approximately 1 mm with the light receiving optical axis 41 as a center. That is, approximately 5 to 10% of the incidence surface with respect to the light amount adjusting member 43 of the reflected distance measuring light serve as the light amount adjusting surface 47.

It is to be noted that a window portion 40 integrally which rotates with the scanning mirror 15 is provided on the optical axis of the distance measuring light reflected by the scanning mirror 15. The window portion 40 tilts at a predetermined angle with respect to the optical axis of the distance measuring light (the projecting optical axis 29). The tilt prevents the distance measuring light (a stray light) reflected by the window portion 40 from entering the photodetector 42.

The tracking light projector 24 has a tracking optical axis 49. Further, the tracking light projector 24 has a tracking light emitter 51, a light projecting lens 52, the beam combiner 33, and the multilayer film optical element 34 which are provided on the tracking optical axis 49. It is to be noted that the light projecting lens 52, the beam combiner 33, and the multilayer film optical element 34 constitute a tracking light projecting optical system. Further, in the present embodiment, the tracking optical axis 49 and the reflected optical axis of the tracking optical axis 49 reflected by the multilayer film optical element 34 are generically referred to the tracking optical axis 49.

The tracking light emitter 51 is, for instance, a laser diode (LD). And the tracking light emitter 51 is configured to emit a laser beam (an invisible light) having an infrared or near-infrared wavelength different from that of the distance measuring light.

The tracking light receiver 25 has a tracking receiving optical axis 53. Further, the tracking light receiver 25 has a tracking photodetector 54 and the receiving prism 44 provided on the tracking light receiving optical axis 53, and also has the focusing lens 45 and the multilayer film optical element 34 provided on the reflected optical axis of the tracking light receiving optical axis 53 reflected by the receiving prism 44. It is to be noted that the receiving prism 44, the focusing lens 45, and the multilayer film optical element 34 constitute a tracking light receiving optical system. Further, in the present embodiment, the tracking light receiving optical axis 53 and the reflected optical axis of the tracking light receiving optical axis 53 reflected by the receiving prism 44 are generically referred to the tracking light receiving optical axis 53.

The tracking photodetector 54 is constituted as a photodetector which receives the tracking light reflected by the object as the reflected tracking light. The tracking photodetector 54 is a CCD or a CMOS sensor which is an aggregation of pixels, and a position of each pixel on the tracking photodetector 54 can be identified. For instance, each pixel has pixel coordinates in a coordinate system with the center of the tracking photodetector 54 as an origin, and its position on the tracking photodetector 54 can be identified by the pixel coordinates. Each pixel outputs the pixel coordinates together with a light reception signal to the arithmetic control module 17.

The laser pointer light projector 26 has a laser pointer optical axis 55. Further, the laser pointer light projector 26 has a light emitter 56, a light projecting lens 57, and a beam splitter 58 as a third deflecting optical member provided on the laser pointer optical axis 55. Further, the laser pointer light projector 26 has the multilayer film optical element 34 provided on the reflected optical axis of the laser pointer optical axis 55 reflected by the beam splitter 58. At this time, an angle formed between the reflected optical axis of the beam splitter 58 and the long-pass filter surface 35 is, for instance, 60° to 120°. Further, the laser pointer light is coaxially deflected with the distance measuring light and the tracking light by the long-pass filter surface 35. That is, the multilayer film optical element 34 is placed on a common optical path of the distance measuring light, the tracking light, the laser pointer light, and a visible light.

It is to be noted that the light projecting lens 57, the beam splitter 58, and the multilayer film optical element. 34 constitute a laser pointer light projecting optical system. Further, in the present embodiment, the laser pointer optical axis 55, the reflected optical axis of the laser pointer optical axis 55 reflected by the beam splitter 58, and the reflected optical axis of the laser pointer optical axis 55 reflected by the multilayer film optical element 34 are generically referred to the laser pointer optical axis 55. Further, the laser pointer optical axis 55 reflected by the beam splitter 58 is parallel to, for instance, the tracking optical axis 49.

The light emitter 56 is, for instance, a laser diode (LD). Further, the light emitter 56 is configured to emit a visible light of, for instance, a red color as the laser pointer light. Further, the beam splitter 58 has optical characteristics to, for instance, transmit 50% of a light and reflect 50% of a light, and deflects the laser pointer light coaxially with the visible light (to be described later). That is, the beam splitter 58 is placed on a common optical path of the laser pointer light and the visible light. It is to be noted that a percentage of each of the transmission and the reflection of the beam splitter 58 is not restricted to 50%, and the percentage is appropriately set in correspondence with a light amount of the laser pointer light and the like.

The image pickup module 27 has an image pickup optical axis 59. Further, the image pickup module 27 has an image pickup element 61, a camera lens group 62 constituted of a plurality of lenses, the beam splitter 58 and the multilayer film optical element 34 which are provided on the image pickup optical axis 59. It is to be noted that the camera lens group 62, the beam splitter 5$ and the multilayer film optical element 34 constitute an image pickup optical system. Further, in the present embodiment, the image pickup optical axis 59 and a reflected optical axis of the image pickup optical axis 59 reflected by the multilayer film optical element 34 are generically referred to as the image pickup optical axis 59.

The image pickup element 61 is a CCD or a CMOS sensor which is an aggregation of pixels, and each pixel can specify a position on the image pickup element 61. For instance, each pixel has pixel coordinates having the center of the image pickup element 61 as an origin, and the position on the image pickup element 61 can be specified by the pixel coordinates. A reception signal and the pixel coordinates output from each pixel are input to the arithmetic control module 17.

It is to be noted that positions of the laser pointer light projector 26 and the image pickup module 27 are set in such a manner that a transmitting position of the projecting optical axis 29 or the tracking optical axis 49 of the long-pass filter surface 35 facing the window portion 40 coincides with a reflecting position of each of the laser pointer optical axis 55 and the image pickup optical axis 59 with respect to the long-pass filter surface 35.

Next, by referring to FIG. 5, a description will be given on the detail of the receiving prism 44.

The receiving prism 44 is constituted with a first prism 63 integrated with a second prism 64. The first prism 63 is a pentagonal dichroic prism having a predetermined refractive index, and the second prism 64 is a rectangular dichroic prism having a predetermined refractive index.

Figure 5:
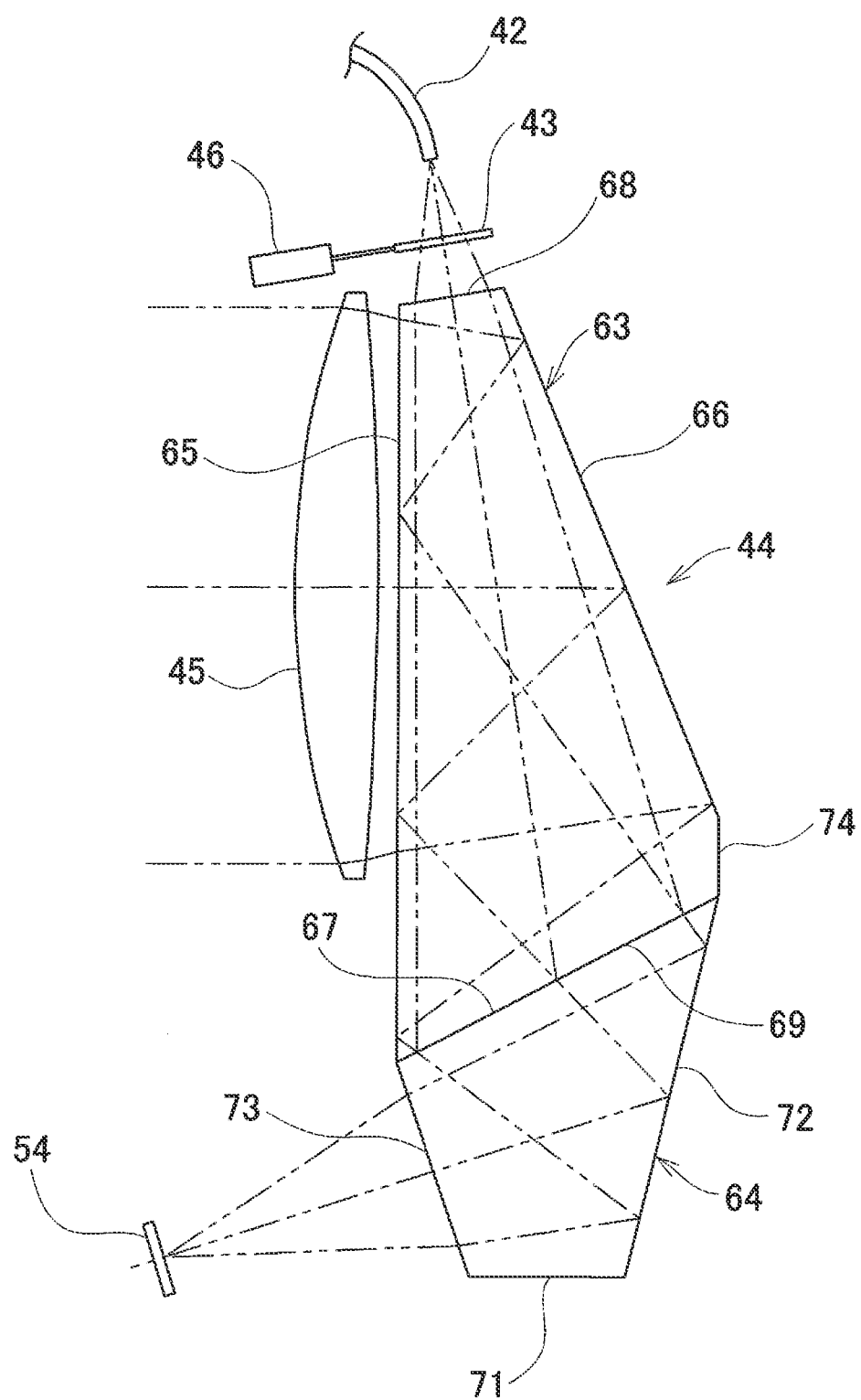
FIG. 5 is a block diagram to show a distance measuring light receiver and a tracking light receiver.

The first prism 63 has a first surface 65 facing the focusing lens 45, a second surface 66 facing the first surface 65, a third surface 67 placed on a lower side with respect to a paper surface in FIG. 5 and a fourth surface 68 placed on an upper side with respect to the paper surface in FIG. 5.

Further, the second prism 64 has a fifth surface 69 making contact the third surface 67, a sixth surface 71 facing the fifth surface 69, a seventh surface 72 placed on a right side with respect to the paper surface in FIG. 5 and an eighth surface 73 placed on a left side with respect to the paper surface in FIG. 5.

The first prism 63 and the second prism 64 are integrated via the third surface 67 and the fifth surface 69. Further, a corner portion formed by the second surface 66 and the third surface 67 of the first prism 63 is chamfered, and a chamfered portion 74 is formed. By the chamfered portion 74, the first prism 63 becomes a pentagonal prism. Further, by the chamfered portion 74, an area of the third surface 67 coincides with an area of the fifth surface 69, and the flush receiving prism 44 is formed of the first prism 63 and the second prism 64.

A surface (an incidence surface) of the first surface 65 is a full-transmission surface with an antireflective film provided thereon. Further, the first surface 65 is orthogonal with respect to the light receiving optical axis 41 and the tracking light receiving optical axis 53, and an incidence angle of each optical axis with respect to the first surface 65 is 0°.

A reflective film is provided on the second surface 66. Further, the second surface 66 tilts at a predetermined angle (for instance, 16°~28°) with respect to the light receiving optical axis 41 and the tracking light receiving optical axis 53. For instance, the second surface 66 is configured in such a manner that the reflected distance measuring light and the reflected tracking light transmitted through the first surface 65 are reflected toward the first surface 65 so that each light strike upon the first surface 65 at a critical angle or a larger angle. Here, an angle of an optical axis with respect to a surface means an angle formed between a normal line of the surface and the optical axis.

Further, the third surface 67 tilts at a predetermined angle (for instance, 13° to 24°) with respect to the light receiving optical axis 41 and the tracking light receiving optical axis 53 reflected by the first surface 65. Further, a dichroic filter film is provided on the third surface 67 or a boundary surface between the third surface 67 and the fifth surface 69. The dichroic filter film is configured to reflect the reflected distance measuring light and transmit through the reflected tracking light. That is, the third surface 67 or the boundary surface between the third surface 67 and the fifth surface 69 is a separating surface which separates the reflected distance measuring light and the reflected tracking light from each other. It is to be noted that the dichroic filter film may be configured to transmit through the reflected distance measuring light and reflect the reflected tracking light.

The fourth surface 68 is a full-transmission surface having an antireflective film provided thereon, and the fourth surface 68 configured to fully transmit through the reflected distance measuring light reflected by the third surface 67. Further, the fourth surface 68 is orthogonal with respect to the light receiving optical axis 41, and an incidence angle of the light receiving optical axis 41 with respect to the fourth surface 68 is 0°.

A reflecting surface is provided on the seventh surface 72. Further, the seventh surface 72 tilts at a predetermined angle (for instance, 16° to 56°) with respect to the tracking light receiving optical axis 53. For instance, the seventh surface 72 is configured in such a manner that the reflected tracking light transmitted through the third surface 67 or the boundary surface between the third surface 67 and the fifth surface 69 strikes upon the seventh surface 72 at a critical angle or a larger angle. Further, the reflected tracking light entered the seventh surface 72 is reflected toward the eighth surface 73.

The eighth surface 73 is a full-transmission surface having an antireflective film provided thereon, and the eight surface 73 configured to fully transmit through the reflected tracking light reflected by the seventh surface 72. Further, the eighth surface 73 is orthogonal with respect to the tracking light receiving optical axis 53, and an incidence angle of the tracking light receiving optical axis 53 with respect to the eighth surface 73 is 0°. It is to be noted that a reflective film or the like is not provided on the sixth surface 71 since the reflected tracking light does not strike upon the sixth surface 71.

Next, a description will be given on a case where the measurement and the tracking are performed by the surveying instrument 1 having the distance measuring module 19. It is to be noted that, in the following description, a movable object such as a prism is measured. Further, various types of operations of the distance measuring unit 19 are performed when the arithmetic control module 17 executes various types of programs.

The distance measuring unit 19 is controlled by the arithmetic control module 17. The light emitter 31 projects a laser beam having a part of the red color or a near-infrared wavelength as a distance measuring light, and the projected distance measuring light enters the beam combiner 33 via the light projecting lens 32. The distance measuring light reflected by the beam combiner 33 is transmitted through the long-pass filter surface 35 of the multilayer film optical element 34, reflected on the beam splitter film 36 of the beam splitter surface 37, and then again transmitted through the long-pass filter surface 35. It is to be noted that the distance measuring light is deflected in a process of being transmitted through the long-pass filter surface 35. The distance measuring light transmitted through the long-pass filter surface 35 is deflected at a right angle by the scanning mirror 15, and irradiated to a predetermined object via the window portion 40.

It is to be noted that an optical axis (the projecting optical axis 29) of the distance measuring light projected from the scanning mirror 15 coincides with the axis 11a. When the scanning mirror 15 rotates around the axis 11a, the distance measuring light becomes orthogonal with respect to the axis 11a, and the distance measuring light is rotated (used for a scan) within a plane including the axis 6a.

The distance measuring light reflected by the object (the reflected distance measuring light) strikes upon the scanning mirror 15 via the window portion 40, and the reflected distance measuring light is reflected at a right angle by the scanning mirror 15. The reflected distance measuring light is transmitted through the multilayer film optical element 34, and then enters the receiving prism 44 while being focused by the focusing lens 45.

The reflected distance measuring light transmitted through the first surface 65 is internally reflected on the second surface 66, the first surface 65, the third surface 67 (or the boundary surface between the third surface 67 and the fifth surface 69) in sequence (three times), and then enters the fourth surface 68 at an incidence angle of 0°. Further, the reflected distance measuring light which has entered the fourth surface 68 is transmitted through the fourth surface 68 and is received by the photodetector 42 via the light amount adjusting member 43.

It is to be noted that the reflected distance measuring light reflected by the second surface 66 strikes upon the first surface 65 at a critical angle or a larger angle. Therefore, the reflected distance measuring light is fully reflected by the first surface 65. Further, the reflected distance measuring light internally reflected in the receiving prism 44 is configured so that the reflected distance measuring light does not interfere with the chamfered portion 74. That is, the chamfered portion 74 is formed outside an optical path of the reflected distance measuring light.

Further, the plate thickness of the light amount adjusting member 43 is known. Therefore, the extension of an optical path length of the reflected distance measuring light produced by the insertion of the light amount adjusting member 43 can be easily corrected by subtracting an offset value based on the plate thickness from a measurement result.

The arithmetic control module 17 performs the distance measurement for each pulse of the distance measuring light based on a time lag between a light emission timing of the light emitter 31 and a light reception timing of the photodetector 42 (that is, a round-trip time of the pulsed light) and a light velocity (Time of Flight). In the light emitter 31, the light emission timing, that is, a pulse interval is changeable, and an emission repetition frequency and the peak power of pulses are changeable.

Since the frame unit 5 and the scanning mirror 15 rotate at constant speeds, respectively, a two-dimensional scan by the distance measuring light is performed by the cooperation between the vertical rotation of the scanning mirror 15 and the horizontal rotation of the frame unit 5. Further, since the distance measurement data (a slope distance) is acquired by the distance measurement for each pulsed light, by detecting a vertical angle and a horizontal angle for each pulsed light by the vertical angle encoder 14 and the horizontal angle encoder 9, the arithmetic control module 17 enables calculating the vertical angle data and the horizontal angle data. Three-dimensional coordinates corresponding to the object can be acquired based on the vertical angle data, the horizontal angle data, and the distance measurement data. Further, when the scanning mirror 15 is rotated and the distance measuring light is rotated and irradiated, the three-dimensional point cloud data can be acquired.

Here, the reflected distance measuring light reflected by the object has an increased light amount in a central portion thereof when the short-distance measurement has been performed, and a decreased light amount in a peripheral portion thereof when the long-distance measurement has been performed. Therefore, a light dimming function brought about by the light amount adjusting surface 47 affects the reflected distance measuring light when the short-distance measurement has been mainly performed.

It is to be noted that, in the above description, the light amount adjusting surface 47 has been described as a reflecting surface, but the light amount adjusting surface 47 should have optical characteristics that allow the transmission of 10% to 50% of a light. For instance, the light amount adjusting surface 47 may be a reflective film having an 80% reflectivity and a 20% transmittance or an absorption film having an 80% absorptance and a 20% transmittance. Alternatively, the light amount adjusting surface 47 may be an electrochromic element having an arbitrary transmittance which can be changed by a voltage. An area or the transmittance of the light amount adjusting surface 47 can be appropriately set in correspondence with an emission repetition frequency (an output) of the distance measuring light, specifications of the focusing lens 45 and the receiving prism 44.

In the present embodiment, the light emitter 31 can change the emission repetition frequency of the distance measuring light and the peak power of pulses in correspondence with properties of the object such as a color of the object or a distance to the object. It is to be noted that, depending on types of the light emitter 31, the emission repetition frequency of the distance measuring light has properties such that the peak power at the pulses becomes smaller as the emission repetition frequency becomes larger, and such that the peak power of the pulses becomes larger as the emission repetition frequency becomes smaller. For instance, in the present embodiment, the peak power is 200 W when the emission repetition frequency of the distance measuring light is 1 MHz, the peak power is 350 W when the emission repetition frequency is 500 kHz, and the peak power is 1000 W when the emission repetition frequency is 100 kHz.

In the present embodiment, for instance, the emission repetition frequency of the distance measuring light is switchably set to 100 kHz and 1 MHz. Further, an allowable light receiving amount of the photodetector 42 is set so that an electrical system is not saturated with the light receiving amount at a short distance when the emission repetition frequency of the distance measuring light is the highest (1 MHz), that is, when the peak power is the lowest (200 W).

For instance, when the emission repetition frequency of the distance measuring light is 100 kHz and the measurement is performed at a short distance, a light receiving amount of the reflected distance measuring light exceeds the allowable light receiving amount of the photodetector 42, and hence the electrical system is saturated. Therefore, in this case, by driving the driving mechanism 46 and inserting the light amount adjusting member 43 into the light receiving optical axis 41, the distance measuring unit 19 can prevent the saturation of the electrical system.

Further, when the repetition frequency of the distance measuring light is 1 MHz and the measurement is performed at a long distance, a light receiving amount of the reflected distance measuring light is reduced. Therefore, in this case, by driving the driving mechanism 46 and removing the light amount adjusting member 43 from the light receiving optical axis 41, the distance measuring unit 19 can acquire a sufficient light receiving amount.

Further, the tracking light emitter 51 projects, as the tracking light, a laser beam having an infrared or near-infrared wavelength which is an invisible light having a wavelength different from that of the distance measuring light concurrently with the above-described distance measurement operation. The projected tracking light enters the beam combiner 33 via the light projecting lens 52. The tracking light transmitted through the beam combiner 33 is transmitted through the long-pass filter surface 35 coaxially with the distance measuring light, reflected on the beam splitter film 36 of the beam splitter surface 37, and then again transmitted through the long-pass filter surface 35. It is to be noted that the tracking light is deflected in a process of being transmitted through the long-pass filter surface 35 like the distance measuring light. The tracking light transmitted through the long-pass filter surface 35 is deflected at a right angle by the scanning mirror 15, and is irradiated to a predetermined object via the window portion 40.

The reflected tracking light reflected by the object is reflected by the scanning mirror 15. Further, the reflected tracking light is transmitted through the multilayer film optical element 34 while being deflected, and then enters the receiving prism 44 while being condensed by the focusing lens 45.

The reflected tracking light transmitted through the first surface 65 is sequentially (two times) internally reflected on the second surface 66 and the first surface 65, and then transmitted through the third surface 67 (or the boundary surface between the third surface 67 and the fifth surface 69). Further, the reflected tracking light transmitted through the third surface 67 is internally reflected on the seventh surface 72, then transmitted through the eighth surface 73 at an incidence angle 0°, and received by the tracking photodetector 54.

It is to be noted that the reflected tracking light reflected on the second surface 66 strikes upon the first surface 65 at a critical angle or a larger angle. Further, the reflected tracking light transmitted through the third surface 67 (or the boundary surface between the third surface 67 and the fifth surface 69) is reflected on the seventh surface 72 at a critical angle or a larger angle, and enters the eighth surface 73. Therefore, the reflected tracking light is fully reflected on the first surface 65 and the seventh surface 72.

The arithmetic control module 17 calculates a deviation between the center of the tracking photodetector 54 and an incidence position of the reflected tracking light. Further, the arithmetic control module 17 controls the horizontal rotation motor 8 and the vertical rotation motor 13 so that the incidence position of the reflected tracking light becomes the center of the tracking photodetector 54 based on the deviation. Thereby, the surveying in main body 3 tracks the object.

Further, the light emitter 56 projects, as a laser pointer light, a laser beam having a wavelength in a red visible light region concurrently with the above-described distance measurement operation and tracking operation. The projected laser pointer light enters the beam splitter 58 via the light projecting lens 57. The laser pointer light reflected by the beam splitter 58 is reflected coaxially with the distance measuring light and the tracking light by the long-pass filter surface 35 of the multilayer film optical element 34. The laser pointer light reflected by the long-pass filter surface 35 is deflected at a right angle by the scanning mirror 15, and is irradiated to the object via the window portion 40. Here, since the laser pointer light is coaxial with the distance measuring light, an irradiating position of the distance measuring light coincides with an irradiating position of the laser pointer light.

The laser pointer light reflected by the object (a reflected laser pointer light) enters the distance measuring unit 19 coaxially with the reflected distance measuring light and the visible light (a background light). The reflected laser pointer light and the visible light are reflected by the long-pass filter surface 35, and enter the image pickup element 61 via the beam splitter 58 and the camera lens group 62.

When the reflected laser pointer light and the visible light enter the image pickup element 61, the arithmetic control module 17 can acquire an image having the reflected laser pointer light as a center, that is, an image having the distance measuring light as a center. It is to be noted that the image acquired here can be also used for the designation of an object or the sighting. Further, an image of the background light alone may be acquired without operating the light emitter 56.

As described above, in the present embodiment, the tracking photodetector 54 and the image pickup element 61 are coaxial with each other and are different members. Therefore, since the tracking photodetector 54 and the image pickup element 61 can acquire sufficient light receiving amounts, respectively, a distance (a reach) enabling the tracking and the imaging can be increased, and the tracking and the imaging can be highly accurately performed even at a long distance.

Further, the beam combiner 33 is configured to coaxially project the distance measuring light and the tracking light as invisible lights having different wavelengths. Therefore, the reach of the distance measuring light and the tracking light can be increased, and the distance measurement and the tracking can be highly accurately performed even at a long distance.

Further, in the present embodiment, the receiving prism 44 having the reflecting surfaces therein is used, and the reflected distance measuring light and the reflected tracking light are internally reflected in the receiving prism 44 more than once. Thereby, the optical paths of the reflected distance measuring light and the reflected tracking light can be bent, and an optical path length for a focal distance of the focusing lens 45 can be assured.

Therefore, since the lengths in the optical axis direction of the distance measuring light receiver 23 and the tracking light receiver 25 can be shortened, the optical system of the distance measuring unit 19 can be downsized, and the entire surveying instrument can be downsized.

Further, a dichroic filter film is provided on the third surface 67 or the boundary surface between the third surface 67 and the fifth surface 69. Therefore, since the reflected distance measuring light can be separated from the reflected tracking light by the dichroic filter film, the receiving prism for shortening the optical paths of the reflected distance measuring light and the reflected tracking light can be shared, and a reduction in number of components and in size of the optical system can be achieved.

Further, the dichroic filter which separates the reflected distance measuring light from the reflected tracking light is provided on the third surface 67 facing the fourth surface 68 side where the photodetector 42 is provided, or the boundary surface between the third surface 67 and the fifth surface 69. Therefore, since the photodetector 42 and the tracking photodetector 54 can be provided at positions apart from each other, the driving mechanism 46 does not interfere with the tracking photodetector 54, and a space for the provision of the driving mechanism 46 can be sufficiently assured.

Further, the reflected tracking light separated by the dichroic filter film is internally reflected in the second prism 64, transmitted to the focusing lens 45 side, and condensed. Therefore, since the tracking light receiver 25 can be provided in a dead space in the distance measuring unit 19, the optical system of the distance measuring unit 19 can be further downsized.

Further, a prism is used as a deflecting optical member for bending the optical path of the reflected distance measuring light, instead of a plate-like mirror. Therefore, a deviation of the optical axis (a deflection angle error) based on temperature changes with respect to the surveying instrument main body 3 can be suppressed and a measurement accuracy can be improved.

Further, the light amount adjusting member 43 which can be inserted into and removed from the light receiving optical axis 41 provided. Therefore, by just inserting or removing the light amount adjusting member 43, the distance measuring unit 19 enables adjusting a light receiving amount of the reflected distance measuring light with respect to the photodetector 42.

Therefore, even in case of performing the short-distance measurement, the emission repetition frequency of the distance measuring light and the peak power of the pulses can be changed in correspondence with properties of the object such as a color of the object, or with the point cloud density to be measured, and the workability can be improved.

Further, since the central portion alone of the light amount adjusting member 43 serves as the light amount adjusting surface 47, only the reflected distance measuring light in the central portion which increases in the short-distance measurement can be dimmed. Therefore, a decrease in light receiving amount at the time of performing the long-distance measurement can be minimized, and hence a reduction of a measurement distance can be suppressed.

Further, the visible light received by the image pickup element 61 enters the distance measuring unit 19 via the scanning mirror 15. Therefore, the cooperation between the rotation of the scanning mirror 15 and the rotation of the frame unit 5 enables acquiring an image of a substantially entire circumference of 360°, except for a lower part that is blocked by the frame unit 5.

Further, since the window portion 40 which integrally rotates with the scanning mirror 15 slightly tilt with respect to the projecting optical axis 29, the distance measuring light reflected by the window portion 40 can be prevented from entering the photodetector 42, and a measurement accuracy can be improved.

It is to be noted that a shape of the receiving prism for reducing lengths in the optical axis direction of the distance measuring light receiver 23 and the tracking light receiver 25 is not restricted to the shape of the receiving prism 44. For instance, like a first mod cation shown in FIG. 6A, a receiving prism 76 which is a combination of the first prism 63 and a pentagonal second prism 75 can suffice.

Figure 6A:
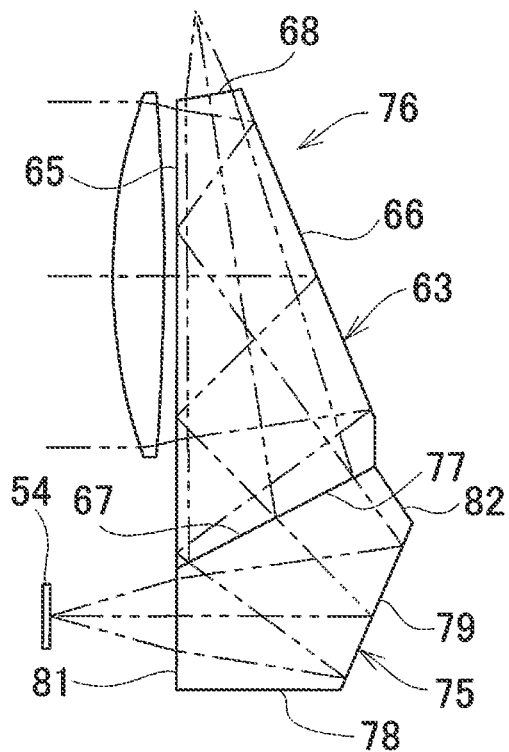
FIG. 6A is a block diagram to show a first modification of a receiving prism.

Further, the chamfered portion 74 has a fifth surface 77 contacting with the third surface 67, a sixth surface 78 facing the fifth surface 77, a seventh surface 79 placed on a right side with respect to the paper surface in FIG. 6A, and an eighth surface 81 placed on a left side with respect to the paper surface in FIG. 6A. The seventh surface 79 tilts at a predetermined angle (for instance, 16° to 28°) with respect to the tracking light receiving optical axis 53, and the eighth surface 81 is flush with the first surface 65.

The first prism 63 and the second prism 75 are integrated via the third surface 67 and the fifth surface 77. Further, a dichroic filter film which reflects the reflected distance measuring light and transmits through the reflected tracking light is provided on the third surface 67 or a boundary surface between the third surface 67 and the fifth surface 77. Further, a corner portion formed by the fifth surface 77 and the seventh surface 79 of the second prism 75 is chamfered, and a chamfered portion 82 is formed. By the chamfered portion 82, the second prism 75 becomes a pentagonal prism, and an area or the third surface 67 matches with an area of the fifth surface 77.

In the receiving prism 76, the reflected tracking light transmitted through the dichroic filter film as a separating surface is reflected by the seventh surface 79 and enters the eighth surface 81 so that an incidence angle becomes 0°. Further, the reflected tracking light transmitted through the eighth surface 81 received by the tracking photodetector 54.

Figure 6B:
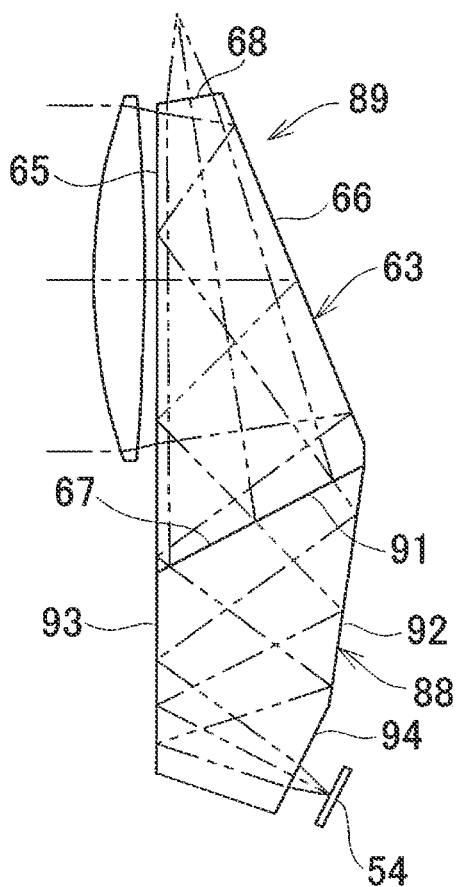
FIG. 6B is a block diagram to show a second modification of the receiving prism.
Figure 6C:
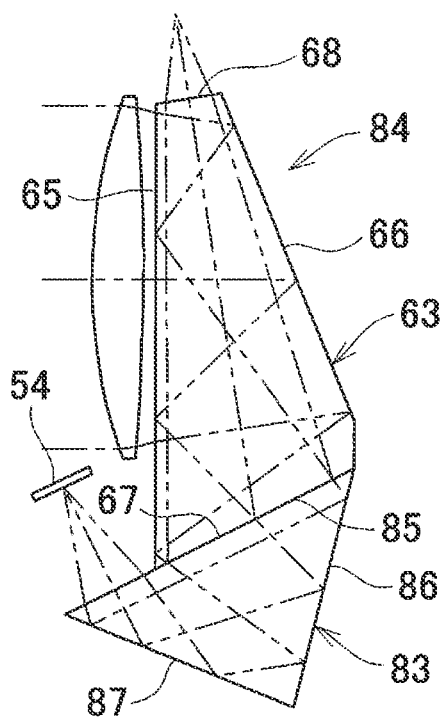
FIG. 6C is a block diagram to show a third modification of the receiving prism.

FIG. 6C shows a second modification of the receiving prism. In the second modification, a receiving prism 84 is constituted by a combination of the first 63 and a prism triangular second prism 83.

The second prism 83 has a fifth surface 85 which is in contact with the third surface 67, a sixth surface 86 which the reflected tracking light transmitted through the fifth surface 85 enters, and a seventh surface 87 which the reflected tracking light reflected on the sixth surface 86 enters. The sixth surface 86 tilts at a predetermined angle (for instance, 16° to 56°) with respect to the tracking light receiving optical axis 53, and the seventh surface 87 tilts at a predetermined angle (for instance, 40° to 75°) with respect to the tracking light receiving optical axis 53. Further, in the receiving prism 84, a part of the fifth surface 85 is integrated with the third surface 67, and a dichroic filter film which reflects the reflected distance measuring light and transmits through the reflected tracking light is provided on the third surface 67 or a boundary surface between the third surface 67 and the fifth surface 85. Further, the receiving prism 84 is configured in such a manner that the reflected tracking light reflected by the seventh surface 87 enters the fifth surface 85 at a position where the fifth surface 85 is not in contact with the third surface 67.

In the receiving prism 84, the reflected tracking light transmitted through the dichroic filter film which is a separating surface is sequentially reflected by the sixth surface 86 and the seventh surface 87 and enters the fifth surface 85 so that an incidence angle becomes 0°. Further, the reflected tracking light transmitted through the fifth surface 85 is received by the tracking photodetector 54.

FIG. 6B shows a third modification of the receiving prism. In the third modification, a receiving prism 89 is constituted by a combination of the first prism 63 and a pentagonal second prism 88.

The second prism 88 has a fifth surface 91 which is in contact with the third surface 67, a sixth surface 92 which the reflected tracking light transmitted through the fifth surface 91 enters, a seventh surface 93 which the reflected tracking light reflected by the sixth surface 92 enters, and an eighth surface 94 which the reflected tracking light reflected by the seventh surface 93 enters. The sixth surface 92 tilts at a predetermined angle (for instance, 20° to 50°) with respect to the tracking light receiving optical axis 53, and the seventh surface 93 tilts at a predetermined angle (for instance, 16° to 46°) with respect to the tracking light receiving optical axis 53. Further, a dichroic filter film which reflects the reflected distance measuring light and transmits through the reflected tracking light is provided on the third surface 67 or a boundary surface between the third surface 67 and the fifth surface 91.

It is to be noted that the seventh surface 93 is flush with the first surface 65, and the eighth surface 94 is orthogonal to the tracking light receiving optical axis 53. That is, an incidence angle of the reflected tracking light with respect to the eighth surface 94 is 0°.

In the receiving prism 89, the reflected tracking light transmitted through the dichroic filter film which is a separating surface is sequentially reflected by the sixth surface 92 and the seventh surface 93 and enters the eighth surface 94 so that an incidence angle becomes 0°. Further, the reflected tracking light transmitted through the eighth surface 94 is received by the tracking photodetector 54.

In any of the cases of FIG. 6A and FIG. 6B, the dichroic filter film is provided on the third surface 67 facing the fourth surface 68, and the dichroic filter film serves as a separating surface. Therefore, since the photodetector 42 and the tracking photodetector 54 can be provided at positions apart from each other, a space for the provision of the driving mechanism 46 can be sufficiently assured.

In the present embodiment and the first to third modifications, the driving mechanism 46 is a solenoid, and the light amount adjusting member 43 is inserted into and removed from the light receiving optical axis 41 by the driving mechanism 46. On the other hand, for instance, a plurality of light amount adjusting surfaces may be provided on a circular plate at intervals of a predetermined angle, and the circular plate may be rotated by a motor or the like so that a light amount adjusting surface placed on the light receiving optical axis 41 can be switched.

Further, in the present embodiment and the first to third modifications, the light receiving optical axis 41 and the tracking light receiving optical axis 53 which enter the receiving prism, and the light receiving optical axis 41 and the tracking light receiving optical axis 53 which are reflected in the receiving prism and projected from the receiving prism are all placed within the same plane. On the other hand, the receiving prism may be configured so that the light receiving optical axis 41 and the tracking light receiving optical axis 53 can be three-dimensionally internally reflected. In this case, the photodetector 42 or the tracking photodetector 54 can be provided on a front side or a rear side with respect to the paper surface.

Further, in the present embodiment and the first to third modifications, the light emitter 31 and the light projecting lens 32 may be provided on a transmission side of the beam combiner 33, and the tracking light emitter 51 and the light projecting lens 52 may be provided on a reflection side of the beam combiner 33. Further, the light emitter 56 and the light projecting lens 57 may be provided on a transmission side of the beam splitter, and the image pickup element 61 and the camera lens group 62 may be provided on a reflection side of the beam splitter 58.

Further, in the present embodiment and the first to third embodiments, the dichroic filter film is provided on the third surface 67 or the boundary surface between the third surface 67 and each of the fifth surfaces 69, 77, 85 and 91, and the reflected distance measuring light is reflected and the reflected tracking light is transmitted through by the dichroic filter film. On the other hand, the dichroic filter film may be configured to transmit through the reflected distance measuring light and reflect the reflected tracking light. In this case, the tracking photodetector 54 is provided on the first prism 63 side, and the photodetector 42 and the light amount adjusting member 43 are provided on each of the second prisms 64, 75, 83 and 88 side.

The invention claimed is:

1. A surveying instrument comprising: a distance measuring light projector configured to project a distance measuring light to an object, a distance measuring light receiver having a photodetector configured to receive a reflected distance measuring light from said object, a tracking light projector configured to project a tracking light to said object, a tracking light receiver having a tracking photodetector configured to receive a reflected tracking light from said object, and an image pickup module configured to receive a background light, wherein said distance measuring light projector and said tracking light projector include a first deflecting optical member configured to deflect any one of said distance measuring light and said tracking light in such a manner that said distance measuring light and said tracking light become coaxial with each other, and said distance measuring light projector, said tracking light projector, and said image pickup module include a second deflecting optical member configured to coaxially reflect said distance measuring light, said tracking light, and said background light respectively and transmit through said reflected distance measuring light reflected from said object and said reflected tracking light reflected from said object, wherein said second deflecting optical member is a multilayer optical element having a predetermined plate thickness, said multilayer film optical element has a first incidence surface present at a position close from said distance measuring light projector and a second incidence surface present at a position away from said distance measuring projector, said first incidence surface is configured to transmit through said distance measuring light and said tracking light and reflect said background light, said second incidence surface has a beam splitter film with a predetermined reflectance formed on an incidence portion for said distance measuring light and said tracking light, an antireflective film is formed on portions other than said beam splitter film, wherein said distance measuring light and said tracking light are reflected coaxially with said background light by said beam splitter film, and said reflected distance measuring light and said reflected tracking light are transmitted through said beam splitter film and said antireflective film.

2. The surveying instrument according to claim 1, further comprising a laser pointer light projector configured to irradiate said object with a laser pointer light, wherein said image pickup module is configured to receive a reflected laser pointer light reflected by said object together with said background light, said laser pointer light projector and said image pickup module include a third deflecting optical member configured to deflect any one of said laser pointer light and said background light in such a manner that said laser pointer light and said background light become coaxial with each other, and said laser pointer light and said reflected laser pointer light are configured to be reflected on said first incidence surface.

3. The surveying instrument according to claim 2, wherein each of said distance measuring light and said tracking light is an invisible light, said laser pointer light is a visible light, and a long-pass filter configured to reflect said visible light and transmit through said invisible light is provided on said first incidence surface.

4. The surveying instrument according to claim 3, wherein said multilayer film optical element has a plate thickness and a tilt angle which enable assuring a predetermined inter-optical-axis distance between optical axes of said distance measuring light and said tracking light and an optical axis of said background light, and is configured to coincide a transmitting position with respect to the first incidence surface of the distance measuring light and the tracking light reflected by the beam splitter film with a reflected position with respect to the first incidence surface of the background light.

5. The surveying instrument according to claim 2, wherein said multilayer film optical element has a plate thickness and a tilt angle which enable assuring a predetermined inter-optical-axis distance between optical axes of said distance measuring light and said tracking light and an optical axis of said background light, and is configured to coincide a transmitting position with respect to the first incidence surface of the distance measuring light and the tracking light reflected by the beam splitter film with a reflected position with respect to the first incidence surface of the background light.

6. The surveying instrument according to claim 2, wherein said distance measuring light receiver and said tracking light receiver include a receiving prism provided on a common optical path of said reflected distance measuring light and said reflected tracking light which have been transmitted through said second deflecting optical member, and said receiving prism is configured to internally reflect said reflected distance measuring light and said reflected tracking light more than once, then separate said reflected distance measuring light from said reflected tracking light, cause said reflected distance measuring light to be received by said photodetector, and cause said reflected tracking light to be received by said tracking photodetector.

7. The surveying instrument according to claim 1, wherein said multilayer film optical element has a plate thickness and a tilt angle which enable assuring a predetermined inter-optical-axis distance between optical axes of said distance measuring light and said tracking light and an optical axis of said background light, and is configured to coincide a transmitting position with respect to the first incidence surface of the distance measuring light and the tracking light reflected by the beam splitter film with a reflected position with respect to the first incidence surface of the background light.

8. The surveying instrument according to claim 1, wherein said distance measuring light receiver and said tracking light receiver include a receiving prism provided on a common optical path of said reflected distance measuring light and said reflected tracking light which have been transmitted through said second deflecting optical member, and said receiving prism is configured to internally reflect said reflected distance measuring light and said reflected tracking light more than once, then separate said reflected distance measuring light from said reflected tracking light, cause said reflected distance measuring light to be received by said photodetector, and cause said reflected tracking light to be received by said tracking photodetector.

9. The surveying instrument according to claim 8, wherein said receiving prism includes a first prism configured to internally reflect said reflected distance measuring light and said reflected tracking light and a second prism configured to internally reflect said reflected tracking light, a boundary surface between said first prism and said second prism is a surface facing a surface of said first prism from which said reflected distance measuring light is projected, and said boundary surface is a separating surface for said reflected distance measuring light and said reflected tracking light.

10. The surveying instrument according to claim 9, wherein a dichroic filter film is provided on said separating surface, and is configured to reflect said reflected distance measuring light and transmit through said reflected tracking light.

11. The surveying instrument according to claim 1, wherein said distance measuring light projector includes a light emitter configured to change an emission repetition frequency of said distance measuring light and a peak power of pulses to at least two emission repetition frequencies and said peak power of pulses, said distance measuring light receiver includes a light amount adjusting member insertable into and removable from an optical axis of said reflected distance measuring light, and said light amount adjusting member is configured to adjust a light receiving amount of said reflected distance measuring light in correspondence with said emission repetition frequency and said peak power of pulses.

12. The surveying instrument according to claim 11, wherein said light amount adjusting member is configured in such a manner that a light amount adjusting surface having a film with a predetermined transmittance is formed at a central portion, and a full-transmission surface having an antireflective film is formed at other portions than said light amount adjusting surface.

13. The surveying instrument according to claim 1, further comprising a frame unit configured to horizontally rotate around a horizontal rotation shaft by a horizontal rotation motor, a scanning mirror configured to vertically rotate around a vertical rotation shaft by a vertical rotation motor provided in said frame unit, to irradiate said object with said distance measuring light and the tracking light, and to receive said reflected distance measuring light and said reflected tracking light from said object, and an arithmetic control module configured to control driving of said horizontal rotation motor, said vertical rotation motor, said distance measuring light projector, and said tracking light projector, wherein the arithmetic control module is configured to control said horizontal rotation motor and said vertical rotation motor based on a light receiving position of said reflected tracking light with respect to said tracking photodetector in such a manner that said object is tracked.

* * * * *